United States Patent [19]

Israel et al.

[11] Patent Number: 4,898,776

[45] Date of Patent: Feb. 6, 1990

[54] ISOCYANATE/SURFACTANT-MODIFIED POLYOL BINDER FOR MANUFACTURE OF LIGNOCELLULOSIC COMPOSITES

[75] Inventors: Michael G. Israel, Clearwater; George A. Grozdits, St. Petersburg; Kenneth G. Trout, Tampa, all of Fla.

[73] Assignee: Jim Walter Reasearch Corp., St. Petersburg, Fla.

[21] Appl. No.: 273,681

[22] Filed: Nov. 21, 1988

Related U.S. Application Data

[63] Continuation-in-part of Ser. No. 912,889, Sep. 29, 1986, abandoned.

[51] Int. Cl.$^4$ ............................................. B32B 27/00
[52] U.S. Cl. ................................. 428/336; 428/425.1; 428/537.1; 524/702
[58] Field of Search ........................ 524/702; 264/109; 428/537.1, 422.8, 326, 425.1

[56] References Cited

U.S. PATENT DOCUMENTS

| | | | |
|---|---|---|---|
| 3,911,922 | 10/1975 | Kliger | 128/296 |
| 4,100,328 | 7/1978 | Gallagher | 428/407 |
| 4,143,014 | 3/1979 | McLaughlin et al. | 260/29.2 TN |
| 4,209,433 | 6/1980 | Hse | 260/29.3 |
| 4,396,673 | 8/1983 | Ball et al. | 428/326 |
| 4,402,896 | 9/1983 | Betzner et al. | 264/115 |
| 4,407,771 | 10/1983 | Betzner et al. | 264/115 |
| 4,431,455 | 2/1984 | Brown et al. | 106/245 |
| 4,451,425 | 5/1984 | Meyer | 264/300 |
| 4,490,517 | 12/1984 | Fuzesi et al. | 527/401 |
| 4,490,518 | 12/1984 | Fuzesi et al. | 527/401 |
| 4,522,975 | 6/1985 | O'Connor et al. | 524/702 |
| 4,528,153 | 7/1985 | Scholl et al. | 264/109 |
| 4,528,154 | 7/1985 | Nguyen et al. | 264/109 |
| 4,546,039 | 10/1985 | Horacek et al. | 428/326 |
| 4,581,387 | 4/1986 | Werner et al. | 521/128 |
| 4,608,407 | 8/1986 | Kerimis et al. | 524/14 |
| 4,609,513 | 9/1986 | Israel | 264/122 |
| 4,692,292 | 9/1987 | Kollmeier et al. | 264/126 |
| 4,752,637 | 6/1988 | Israel | 524/702 |

FOREIGN PATENT DOCUMENTS

60766 8/1973 Australia.

OTHER PUBLICATIONS

Herczeg, A., "Wettability of Wood," Forest Products Journal, pp. 499–505, Nov. 1965.
Wilson, J. B., and Krahmer, R. L., "Using Resin Properties to Predict Strength of Oak Particleboard," Adhesives Age, Jun. 1979.
Wilson, J. B., "Isocyanate Adhesives as Binders for Composition Board," Adhesives Age, pp. 41–44, May 1981.
Gallagher, J. A., "Urethane Bonded Particleboard," Forest Products Journal, vol. 32, No. 4, pp. 26–33, Apr. 1982.

Primary Examiner—Ellis P. Robinson
Assistant Examiner—P. J. Ryan
Attorney, Agent, or Firm—Charles W. Vanecek

[57] ABSTRACT

A synthetic board is prepared by a process of contacting lignocellulosic material with a binder and subsequently forming the treated material into a board by the application of heat and pressure, wherein (a) the binder comprises an organic polyisocyanate and a reactive hydrogen-containing component, especially an aromatic polyester polyol, and (b) the lignocellulosic material is additionally contracted with a surfactant.

10 Claims, No Drawings

ISOCYANATE/SURFACTANT-MODIFIED POLYOL BINDER FOR MANUFACTURE OF LIGNOCELLULOSIC COMPOSITES

This is a continuation-in-part, of Application Ser. No. 912,889, filed Sept. 29, 1986, now abandoned.

BACKGROUND OF THE INVENTION

1. Field of the Invention

This invention relates to an improved process for bonding cellulosic and/or ligno-cellulosic materials in the production of synthetic board products by utilizing a surfactant-modified polyol/polyisocyanate binder.

2. Description of the Prior Art

Many board products are manufactured by the basic process of consolidating or joining together bodies of cellulosic and/or ligno-cellulosic materials using pressure, heat and a chemical binder. Typical binders used in making such products are thermosetting resins such as phenol-formaldehyde, resorcinol-formaldehyde, melamine-formaldehyde, urea-formaldehyde, modified lignosulfonates, urea-furfural and condensed furfuryl alcohol resins. Another binder system involves the use of organic polyisocyanates, either alone or in combination with other binder materials such as urea- or melamine-formaldehyde resins, phenol-formaldehyde resins, lignosulfonates, furfurals, etc.

The use of polyisocyanate binders in the production of board products is subject to the drawbacks that the isocyanates generally are more expensive than the commonly used formaldehyde binder systems, and the boards produced with the isocyanates have a tendency to adhere to the platens used in their formation. This adhesion can damage or even ruin the board product, and the subsequent cleanup of the contaminated platens is difficult, time-consuming and costly.

Various attempts have been made to overcome this adhesion problem without sacrificing other desirable board properties. Conventional release agents such as oils, wax polishes, silicones and polytetrafluoroethylene have been tried and found wanting.

Another approach involves incorporating into organic polyisocyanate-based binders various additives as internal agents to reduce sticking and produce articles of good quality. For example, U.S. Pat. No. 4,100,328 discloses the use of a polyether polyol-organic polyisocyanate binder composition for bonding cellulosic materials and eliminating sticking to mold faces. Unfortunately, in this binder composition a portion of the rather costly isocyanate component is replaced by polyols which themselves are relatively expensive materials.

The use of polyols in general as reactive additives for polyisocyanate binder compositions is disclosed in U.S. Pat. No. 4,546,039, wherein the polyols are used to prepare isocyanate group-containing prepolymer bonding agents. U.S. Pat. No. 4,609,513 also discloses the usefulness in isocyanate binder systems of polyols generally, including the expensive polyether polyols of the Gallagher patent referred to above. This patent further discloses the need for the concomitant incorporation of a fatty acid component to manufacture board products having acceptable properties.

OBJECTS OF THE INVENTION

It accordingly is an object of the present invention to provide as a binder for the production of synthetic boards from ligno-cellulosic and/or cellulosic materials a surfactant-modified combination of an isocyanate with a relatively inexpensive diluent which significantly reduces the overall cost of the system but still contributes to the obtainment of desirable board properties, including superior strength, moisture resistance and release.

It is a further object of the present invention to provide a simple and economical process for producing a synthetic board product through the use of the improved binder system of the invention, which exhibits superior adhesive characteristics in the board and is particularly effective in minimizing unwanted adhesion to the platens used in producing the board.

It is a still further object of the present inVention to provide a synthetic board product, especially a particle board, waferboard, oriented waferboard or oriented strand board, which has a combination of excellent properties, including superior strength, dimensional stability and durability.

It is another object of the present invention to provide a low density synthetic board product having excellent properties, including superior strength.

These and other objects and advantages of the present invention will become more apparent to those skilled in the art from the following detailed description.

SUMMARY OF THE INVENTION

The above objects have been achieved in the process of the present invention for forming shaped articles by the hot pressing of a composition of a comminuted lignocellulosic material utilizing a binder comprising a combination of a polyisocyanate with a reactive hydrogen-containing compound and modifying the binder by adding a surfactant thereto. The binder system can be used in the production of both interior and exterior grade board products and is especially useful in the manufacture of waferboard, particle board and oriented strand board.

The polyisocyanate of the binder system may suitably be any organic polyisocyanate compound containing at least 2 active isocyanate groups per molecule, or mixtures of such compounds. Polyphenyl polyisocyanates, such as diphenylmethane-4,4'-diisocyanate and polymethylene polyphenyl polyisocyanates, are particularly suitable.

Employed in conjunction with the polyisocyanate is a reactive hydrogen-containing component, preferably a polyol. Examples of polyols are polyether and polyester polyols, with the latter being preferred. The polyester polyols of the binder system suitably do not include those prepared from fatty materials such as fatty acids. Suitable polyester polyols include, for example, reaction products of polyhydric alcohols with polybasic carboxylic acids. The alcohols and/or the acids may, of course, be used as mixtures of two or more compounds in the preparation of the polyester polyols.

A preferred binder of the invention comprises a polyisocyanate, particularly a polymethylene polyphenyl polyisocyanate, and a polyester polyol, with the proviso that said binder does not contain any fatty acid material.

The polyester polyols of the present binder system generally have hydroxyl numbers ranging from about 100 to 700, preferably from about 100 to 400, and have an average funtionality of from about 1 to 8, more preferably from about 2 to 3, and most preferably about 2.

In a particularly preferred embodiment of the invention, the polyol comprises an aromatic polyester polyol.

The aromatic polyester polyols advantageously contain at least two hydroxyl groups and generally have a molecular weight of from about 150 to 5,000. Preferably, these polyesters contain from 2 to 8 hydroxyl groups and have a molecular weight of from about 220 to 800, more preferably from about 270 to 400. The acid component of these polyesters preferably comprises at least 40% by weight of phthalic acid residues. By phthalic acid residue is meant the group

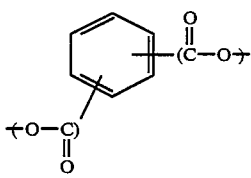

Particularly suitable compositions containing phthalic acid residues for use in the invention are (a) ester-containing by-products from the manufacture of dimethyl terephthalate, (b) scrap polyalkylene terephthalates, and (c) phthalic anhydride residues.

The surfactant is incorporated in the binder system to improve the wetting characteristics of the system on the wood particle surfaces and to help to compatibilize the isocyanate with the reactive hydrogen-containing component. The surfactant makes it possible to achieve optimum wetting by adjusting the surface tension of the binder, and more specifically the reactive hydrogen-containing component, to a value equal to or lower than the critical surface tension of the wood substrate. Use of the surfactant is particularly advantageous where the surface tension of the binder is higher than the critical surface tension of the specific lignocellulosic material to be bonded. The surfactants of this invention are found to bring about a desirable reduction in the surface tension of the preferred polyester polyol component of the binder system and thereby contribute to the obtainment of improved board properties (e.g., board strength). The surfactant is advantageously present in sufficient amount to increase the strength of the synthetic board to above the strength it would have with the surfactant omitted.

If desired, other conventional binding agents, such as formaldehyde condensate adhesive resins, may be used in conjunction with the present binder system.

DETAILED DESCRIPTION OF THE INVENTION

The method of the present invention is suitable for processing cellulosic starting materials in general, and is particularly useful for forming wood particles into board products. Mixtures of cellulosic particles may be used. Typically, such materials are wood particles derived from wood and wood residues such as wood chips, wood fibers, shavings, veneers, wood wool, cork, bark, sawdust, and the like. Particles of other cellulosic material such as shredded paper, pulp or vegetable fibers such as corn stalks, straw, bagasse and the like, and of non-cellulosic materials such as shredded scrap rubber, polyurethane, polyisocyanurate and like cellular and non-cellular polymers can also be used. Inorganic materials such as hydrated alumina, gypsum, chopped mineral fibers and the like can also be employed, either alone or in combination with any of the above cellulosic or non-cellulosic materials, in the formation of boards in accordance with the present invention.

The board is produced according to the process of the invention by bonding together particles of wood or other cellulosic material using heat, pressure and the surfactant-modified binder system of the invention. The invention particularly relates to an improved process of preparing synthetic boards wherein cellulosic material is contacted with a binder and the treated material is subsequently formed into boards by the application of heat and pressure, the improvement comprising (a) utilizing as binder an organic polyisocyanate and a reactive hydrogen-containing component, preferably an aromatic polyester polyol, and (b) additionally contacting the lignocellulosic material with a surfactant. While the process is particularly suitable for the manufacture of waferboard, oriented waferboard, particleboard, and oriented strand board, it is not limited in this respect and can also be used in the manufacture of medium density fiberboard, plywood, etc.

To improve wetting of the wood substrate by the binder, the binder composition includes a surfactant. The surfactant should be one which adjusts the surface tension of the binder composition to a value about equal to or lower than the critical surface tension of the specific substrate and helps to compatibilize the binder components. Many surfactants can be incorporated in the binder provided their composition is such and they are sued in such proportions that they result in the aforesaid surface tension adjustment. Also, the surfactants should have good compatibility with the various constituents of the binder composition. The amount of surfactant required for a particular application may be readily determined by routine experimentation, and normally ranges from about 0.01 to 5 percent by weight, based on the weight of the reactive hydrogen-containing component.

Nonionic surfactants are preferred, such as the ethylene oxide condensates derived from vegetable oils, such as castor oils, from alcohols, organic acids, phenols, hydroxy esters, etc. More specifically, such emulsifiers include castor oil condensed with 6 to 60% or more oxyethylene units, alkylphenoxypolyethoxyethanols having alkyl groups of about seven to eighteen carbon atoms and 6 to 60 or more oxyethylene units, such as heptylohenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule, analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.,; also ethylene oxide condensates of long-chain or branched-chain amines, such as dodecylamine, hexadecylamine, and octadecylamine, containing 6 to 60 oxyethylene groups, block copolymers of ethylene oxide and propylene oxide comprising a hydrophobic propylene oxide section combined with one or more hydrophilic ethylene oxide sections.

Other suitable surfactants are the silicone surfactants, e.g., polyoxyalkylene-polyalkyl-siloxane, and the polyoxyalkylene/unsaturated diester reaction products described in U.S. Pat. Nos. 4,365,024 and 4,529,745. Examples of the latter surfactants are those supplied by Sloss Industries Corporation under the trademark FOAMSTAB.

As mentioned above, the binder system may suitably contain any organic polyisocyanate containing two or more isocyanate groups. The polyisocyanates which may be employed include the aliphatic, cycloaliphatic and aromatic polyisocyanates, and combinations thereof. Representative of these types are the following: m- and p-phenylene diisocyanates, toluene-2,4- and 2,6-diisocyanates, diphenylmethane-4,4-diisocyanate, 4-chloro-1,3-phenylene diisocyanate, naphthalene-1,5-diisocyanate, diphenylene-4,4-diisocyanate, 3,3'-dimethyl diphenylmethane-4,4'-diisocyanate, 3-methyl-diphenylmethane4,4'-diisocyanate, diphenylether diisocyanate, cyclohexane2,4- and 2,3-diisocyanates, 1-methyl cyclohexyl-2,4- and 2,6-diisocyanates bis-(isocyanatocyclohexyl-) methane, 2,4,6-triisocyanatotoluene, 2,4,4-tri-isocyanatodiphenyl ether, polymethylene polyphenyl polyisocyanates, methylene diphenyl diisocyanate, triphenylmethane triisocyanate, 3,3'-ditolylene-4,4-diisocyanate, 4,4'-methylenebis (2-methyl-phenyl isocyanate), hexamethylene diisocyanate, and cyclohexylene-1,3- and 1,2-diisocyanates. Preferred polyisocyanates are polymethylene polyphenyl polyisocyanates.

In the production of the preferred polyester polyols of the binder system, the corresponding polycarboxylic acid anhydrides or corresponding polycarboxylic acid esters or mixtures thereof may be used for the production of the polyesters instead of the free polycarboxylic acids. The polycarboxylic acids may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; terephthalic acid dimethyl ester and terephthalic acid-bis-glycol ester.

Any suitable polyhydric alcohol may be used in preparing the polyester polyols. The polyols may be aliphatic, cycloaliphatic, aromatic and/or heterocyclic, and are preferably selected from the group consisting of diols and triols. Low molecular weight polyols such as aliphatic dihydric alcohols having from 2 to 16 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like, may also be used. Moreover, the polycarboxylic acid(s) may be condensed with a mixture of polyhydric alcohols and amino alcohols.

Examples of suitable polyhydric alcohols include: ethylene glycol; propylene glycol-(1,2) and -(1,3); butylene glycol-(1,4) and -(2,3); hexane diol-(1,6); octane diol-[1,8); neopentyl glycol; 1,4-bishydroxymethyl cyclohexane; 2-methyl1,3-propane diol; glycerin; trimethylolpropane; trimethylolethane; hexane triol-(1,2,6); butane triol-(1,2,4); pentaerythritol; quinitol; mannitol; sorbitol; formitol; a-methylglucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are oxyalkylene glycols, such as diethylene glycol, dipropylene glycol, triethylene glycol, tripropylene glycol, tetraethylene glycol, tetrapropylene glycol, trimethylene glycol and tetramethylene glycol.

The preferred aromatic polyester polyols of the invention include, for example, reaction products of polyhydric, preferably dihydric and optionally trihydric and higher funtionality alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyester. O-phthalic acids, isophthalic acids and/or terephthalic acids may be used as the phthalic acid. The polyhydric alcohols and the optional polybasic-carboxylic acids may be any of those referred to above as suitable for the preparation of the polyester polyols of the invention. The aromatic polyester polyols of the binder should contain a sufficient amount of the above-defined phthalic acid residues to improve the properties of the synthetic board, especially the board strength and dimensional stability, i.e., to enhance the board properties to above the values the board would have if the polyester polyol were replaced by a polyether polyol of substantially the same functionality and equivalent weight.

Other conventional polyols such as polyether polyols may be used in minor amounts in the binder composition of the invention. Minor amounts of these polyol additives may be defined as amounts which do not detract from the enhanced board properties stemming from use of the polyester polyols, especially the aromatic polyester polyols. The polyester polyols of the invention preferably comprise at least about 65–100 weight %, and more preferably about 85–100 weight % of the polyol component of the binder composition.

While the polyester polyols can be prepared from substantially pure reactant materials, more complex ingredients may be used, such as side-stream, waste or scrap residues from the manufacture of phthalic acid, terephthalic acid, dlmethyl terephthalate, polyethylene terephthalate, adipic acid and the like. Suitable polyol side-stream sources include ethylene glycol, diethylene glycol, di- and triethylene glycol and higher homologs. The similar homologous serie of propylene glycols can also be used. The aromatic and/or aliphatic polyester polyols thus obtained from low cost raw materials offset the cost premium for isocyanate versus phenol- or urea-formaldehyde binder systems. Polyester polyols derived from raw materials containing compounds having the above defined phthalic acid residues constitute a preferred binder component of the invention.

The polyols of the binder composition suitably contain a sufficient amount of primary (1°) hydroxyl groups for enhanced board properties (e.g., board strength and durability). The presence of such groups is readily brought about by using in the preparation of the polyester polyols alcohols containing the groups, such as lycols like diethylene glycol, triethylene glycol, higher homologs, and mixtures thereof, and optionally their mixtures with at least one other primary hydroxyl group-containing alcohol.

The polyester polyols of the invention generally contain about 0 to 35% excess unreacted polyol starting material and have an acid number less than 10. These polyester polyols advantageously comprise
(a) about 65 to 100%, preferably 85 to 100%, by weight, of polyester polyol (especially aromatic polyester polyol),
(b) about 0 to 35%, preferably 0 to 15%, by weight, of an alkylene glycol having the formula $$HO-(CH_2CHO)_n-H \quad\quad (A)$$
$$\phantom{HO-(CH_2CH}|$$
$$\phantom{HO-(CH_2CHO)_n}R$$

where R is hydrogen or lower alkyl of one to four carbon atoms and n is from 1 to 10, preferably 1 to 3, and more preferably 2 to 3, and
(c) about 0 to 35%, preferably 0 to 15%, by weight, of a least one other polyol (e.g., a polyol of functionality greater than 2).

Alkylene glycols of formula (A) are especially useful in the transesterification and digestion of dimethyl terephthalate residues, PET scrap, phthalic anhydride bottoms, crude or light ends compositions, and the like. Additional glycol may be added after the transesterification and digestion procedures for appropriate adjustment of the equivalent weight. Examples of the alkylene glycols are ethylene glycol, propylene glycol, diethylene glycol, dipropylene glycol, triethylene glycol, tripropylene glycol and tetrapropylene glycol, among other, and mixture thereof. Especially suitable glycols are diethylene and triethylene glycols. The term "polyester polyol" as used in this specification and claims thus includes any minor amounts of unreacted polyol remaining after the preparation of the polyester polyol and/or unesterified polyol added after the preparation.

A preferred hydroxy terminated aromatic polyester for use in the present invention is prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. This residue is described in U.S. Pat. No. 3,647,759, and suitable transesterified polyol mixtures are described in U.S. Pat. No. 4,237,238, the disclosures of which patents are hereby incorporated bY reference. Two preferred transesterifying glycols which can be reacted with the residue are ethylene glycol and diethylene glycol, with the latter being more preferred. Examples of transesterified residues which can be used in accordance with the invention are those supplied by Hercules, Inc., Wilmington, Del. under the trade name of Terate ® resins.

An excess of the transesterifying glycol advantageously may be used to react with the residue defined above. The amount of this preferred excess of transesterifying glycol remaining in the transesterified polyol mixture can vary broadly but suitably falls within a range of from about 5 to about 30 percent by weight of said polyol mixture.

Another preferred aromatic polyester polyol which can be employed is prepared by the transesterification, with a glycol of molecular weight from about 60 to 400, of a byproduct fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An especially useful polyol mixture can be prepared by transesterifying a by-product fraction from the manufacture of dimethyl terephthalate comprising a mixture of:
(a) about 40 to 60 percent by weight of dimethyl terephthalate,
(b) about 1 to 10 percent by weight of monomethyl terephthalate,
(c) about 1 to 2 percent by weight of terephthalic acid,
(d) about 10 to 25 percent by weight of bi-ring esters,
(e) about 5 to 12 percent by weight of organic acid salts,
(f) about 18 to 25 percent by weight of polymeric materials, and
(g) about 1 to 4 percent by weight of ash.

An excess of the transesterifying glycol is advantageously used to react with the by-product fraction. Two preferred glycols for transesterifying the by-product fraction are ethylene glycol and diethylene glycol, with the latter being more preferred. The properties of the polyol mixture produced by the transesterification are described in U.S. Pat. No. 4,411,949, the disclosure of which is hereby incorporated by reference. Examples of this transesterified by-product fraction of the invention are the products supplied by Sloss Industries Corporation under the trademark Foamol.

Still other preferred aromatic polyester polyols are those produced by digesting polyalkylene terephthalate, especially polyethylene terephthalate (PET), residues or scraps with organic polyols, such as the digestion products disclosed in U.S. Pat. Nos. 4,223,068, 4,417,001, 4,469,824, 4,529,744 and 4,604,410 and European Patent No. 0 093 247 and European Application No. 84 304687.1.

Especially preferred are those polyols prepared by digesting polyalkylene terephthalate polymers with a polycarboxylic acid component-containing polyol derived from a digesting polycarboxylic acid component and a digesting polyol component. Advantageously, the polycarboxylic acid component has ring units with two $$-\overset{\overset{\displaystyle O}{\|}}{C}-O-$$

groups on adjacent (or ortho) or alternate (or meta) ring positions. Examples of suitable polycarboxylic acid components are phthalic anhydride, phthalic acid, isophthalic acid, trimellitic anhydride, trimellitic acid, benzo-phenone-tetracarboxylic dianhydride, esters of these polycarboxylic acid components and mixtures thereof. Suitable digesting polyol components include glycols, such as diethylene glycol, dipropylene glycol, mixtures of these glycols and their mixtures with at least one other oxyalkylene glycol.

When PET is digested by the polycarboxylic acid component-containing polyol, it has been found advantageous to distill from the resultant digested polyol mixture sufficient ethylene glycol liberated in the digestion to improve the storage stability of the mixture. The polycarboxylic acid component-containing polyol preferably includes at least one glycol which is co-distillable with the liberated ethylene glycol, and the distillation is conducted to distill from the digested polyol mixture the amount of liberated ethylene glycol and co-distillable glycol sufficient for improved storage stability of the mixture. The distillation advantageously is conducted rapidly at reduced temperature and pressure to prevent or minimize the liberation of further ethylene glycol from the polyethylene terephthalate during the distillation. A most preferred distilled polyol mixture is prepared with a digesting medium derived from phthalic anhydride and diethylene glycol, and is characterized by an equivalent weight of 100-250 grams-/equivalent of OH, a low free ethylene glycol content, e.g., less than 1%, preferably less than 0.5%, by weight, and a free diethylene glycol level in the 3 to 30 weight % range.

U.S. Pat. Nos. 4,539,341 and 4,758,607 describe the preparation and properties of preferred digestion and distillation products obtained through use of the polycarboxylic acid component-containing digesting medium. The disclosures of these patents are hereby incorporated by reference.

Still another desirable aromatic polyester polyol is prepared by (a) transesterification, with the aforesaid polycarboxylic acid component-containing polyol, of the residue remaining after dimethyl terephthalate and methyl p-toluate have been removed from the product of oxidation of p-xylene in the preparation of dimethyl terephthalate, or (b) esterification, with the polycarboxylic acid component-containing polyol, of a carboxyl functional residue resulting from the removal of terephthalic acid from the mixture obtained by the oxidation of p-xylene in the preparation of terephthalic acid.

The preparation and properties of this polyester polyol are described in U.S. Patent No. 4,652,591, the disclosure of which is hereby incorporated by reference.

In another advantageous embodiment of the invention, the binder comprises a polyisocyanate, particularly a polymethylene polyphenyl polyisocyanate, and a polycarboxyl compound. The polycarboxyl compound is suitably a fatty material selected from the group consisting of a polyfunctional polymeric fatty acid, a chain-extended polycarboxyl compound containing a polymeric fatty radical and mixtures thereof. These fatty materials are described in U.S. Pat. No. 4,772,442, the disclosure of which patent is hereby incorporated by reference.

In the binder composition of the invention, the equivalent ratio or binder index of polyisocyanate to polyol is generally about 10:1 to 2:1, preferably 8:1 to 3:1. The quantity of binder needed in a particular board-forming process can be determined by simple experimentation. An application of from about 0.5 to 25%, preferably 1.5 to 9% of total binder composition, solids basis, may generally be employed. If desired, other standard materials, such as fire retardants, pigments, catalysts, additional internal release agents, water-repellants (e.g., sizing agents), etc., may also be applied.

The process of the invention is readily carried out by applying the organic polyisocyanate, reactive hydrogen-containing component and surfactant to the wood particles in any suitable manner, such as by spraying, and then subjecting the treated material to heat and pressure. Before the compression molding step, the wood particles, binder and surfactant are desirably blended together in a suitable mixing machine, e.g., a rotary blender. The board formation is suitably accomplished in a heated press between caul plates. The binder composition of the invention is suitably applied to moist wood particles which are generally at a moisture content of about 3-25%, and preferably of about 5-10%, based on the dry weight of the wood particles. The reactive hydrogen-containing component and surfactant, which are suitably premixed, may be applied before, simultaneously with, or after the polyisocyanate. In a desirable embodiment of the invention, the binder components and surfactant are premixed immediately or fairly close in time before their application to the wood particles. This simplifies application and avoids excessive viscosity buildup. In another advantageous embodiment, the reactive hydrogen-containing component is suitably applied after the polyisocyanate. Although the binder components may be applied in the form of a solution or dispersion, the components preferably are applied neat. Pressing times, temperatures and pressures vary widely depending on the thickness of the board produced, the desired density of the board, the size and type of the particles used, and other factors well known in the art.

The above-described process can be carried out batchwise or in a continuous manner. It is also within the scope of the invention to apply a release agent to the metal surfaces of the press before a manufacturing run is commenced, if desired. This may aid in insuring that minimal adherence of the board to the metal surfaces takes place. Any material known to those in the art as being suitable as a release agent may be employed, e.g., iron, calcium or zinc stearate compounds.

The binder composition of the present invention may also be used in conjunction with conventional thermosetting resin binders, such as phenol-formaldehyde, resorcinol-formaldehyde, melamine-formaldehyde, urea-formaldehyde, urea-furfural, and the like. Other modifications should be readily apparent to those skilled in the art.

A preferred embodiment of the invention involves the blow line addition of the binder composition in manufacturing board products. Procedures and equipment for this type of application are described in U.S. Pat. Nos. 4,402,896, 4,407,771 and 4,533,436, the disclosures of which patents are hereby incorporated by reference.

More detailed descriptions of methods of manufacturing lignocellulosic composites of the invention, such as medium density fiberboards, hardboards, particleboards, flakeboards, waferboards, oriented strand boards, oriented waferboards, and lumber or timber shaped composites, are available in the prior art. The techniques and equipment conventionally used can be adapted for use with the compositions of the invention.

The binder compositions of the invention are effective in minimizing unwanted adhesion during board formation, and the lignocellulosic composite materials produced have superior physical properties, including improved strength and dimensional stability (i.e., low thickness swell), and may be used in any of the situations where such articles are customarily employed. While use of the binder composition results in exemplary strength over a broad range of board densities, its superior adhesive characteristics are especially evident in lower density board products, such as those of 44 pcf density and lower, more particularly those whose density is less than about 40 pcf. These lower density boards of the invention are found to be superior in strength to comparable boards bonded with straight organic polyisocyanates.

The invention is further illustrated by the following examples in which all parts and percentages are by weight unless otherwise indicated.

EXAMPLE 1

This example illustrates the effect on particleboard properties of reducing the surface tension of a polyisocyanate/polyol binder system employed in manufacturing the boards.

Planer shavings [southern yellow pine) were rotated in a rotary blender and treated sequentially by spray application of polyol[1] first followed by the polyisocyanate[2] component for each of Binder Nos. 1-5 of the following Table I. In each case, the binder level was 2.75% and binder index was 4.0. For each of Binder Nos. 2-5, the levels of surfactants shown in the table were incorporated in the polyol component by premixing before application to the wood particles. The surface tension values shown in the table were measured with a DuNouy tensiometer.

The treated furnish was compression molded at 650 to 120 psi pressure and a temperature of about 350° F between stainless steel platens to produce boards having a density of 48 pcf. Testing of the boards for static bending and internal bond strength was carried out according to ASTM D1037-72, except that 2' x 2' boards and correspondingly smaller test samples were utilized.

As shown in Table I, the reduction of polyol surface tension to below the critical surface tension (52 dynes/cm) of the particleboard furnish gave significantly higher strength values in comparison to boards made without surfactant adjustment.

1. Polyol=reaction product of dimethyl terephthalate residue and diethylene glycol having an equivalent weight of and containing 14% diethylene glycol and prepared according to U.S. Pat. No. 4,411,949.
2. Polyisocyanate - Mondur MR, a polymethylene polyphenyl isocyanate available from Mobay Chemical Corporation.

TABLE I
EFFECT OF POLYOL SURFACE TENSION ADJUSTMENTS ON PARTICLEBOARD

| BINDER NO. | SURFACTANT LEVEL IN POLYOL wt. % | POLYOL SURFACE TENSION dynes/cm | BOARD STRENGTHS psi IB | MOR |
|---|---|---|---|---|
| | SYP* Particles[1] | 52.0 | | |
| 1 | None | 58.3 | 101 | 1475 |
| 2 | .05% Trylox 1186[2] | 44.4 | 139 | 1976 |
| 3 | .25% Trylox 1186[2] | 44.4 | 139 | — |
| 4 | .50% Trylox 1186[2] | 40.7 | 139 | — |
| 5 | .75% Trylox 1186[2] | 38.7 | 136 | — |

[1]*SYP = Southern yellow pine.
[2]Trylox 1186 = Ethoxylated sorbitol hexatallate available from Emery Chemicals.

EXAMPLE 2

Following the procedure of Example 1, particleboards were prepared from planer shavings (southern yellow pine) using as binder the same polyol and polyisocyanate at the same level and binder index, and incorporating the levels of the surfactants shown in the following Table II.

The order of binder application (polyol first) and premixing of polyol and surfactant were accomplished as described in Example 1. Testing of the boards according to the procedure of Example 1 demonstrated that reduction of the surface tension of the polyol is accompanied by an increase in the strength of the resulting particleboard.

TABLE II
EFFECT OF POLYOL SURFACE TENSION ADJUSTMENTS ON PARTICLEBOARD

| BINDER NO. | SURFACTANT LEVEL IN POLYOL wt. % | POLYOL SURFACE TENSION dynes/cm | BOARD STRENGTH psi IB | MOR |
|---|---|---|---|---|
| | SYP* Particles[1] | | | |
| 1 | None | 58.3 | 101 | 1475 |
| 2 | 1.0% Siponic TD3[2] | 47.2 | 131 | 1821 |
| 3 | 2.0% Foamstab 200[3] | 44.2 | 115 | 1653 |

[1]*SYP = Southern yellow pine.
[2]Siponic TD3 = Ethoxylated tridecyl alcohol, available from Alcolac Inc.
[3]Foamstab 200 = Polyoxyalkylene/unsaturated diester reaction product, available from Sloss Industries Corporation.

EXAMPLE 3

This example illustrates the effect on particleboard properties of changing the binder addition sequence of the previous examples.

Particleboards were prepared from planer shavings (southern yellow pine) using as binder the same polyol and polyisocyanate at the same level and binder index of the previous examples and incorporating the level of the surfactant shown in the following Table III. The procedure of the previous examples was followed, except that the isocyanate was sprayed onto the particleboard furnish first followed by the polyol, which had been premixed with the surfactant.

The Table III testing results show that the addition of isocyanate to the furnish first gave a significant improvement in board strength. Introduction of the surfactant yielded higher strength values for either sequence of addition.

TABLE III
EFFECT OF BINDER ADDITION SEQUENCE ON PARTICLEBOARD

| BINDER NO. | SURFACTANT LEVEL IN POLYOL wt. % | BINDER ADDITION SEQUENCE | BOARD STRENGTH psi IB | MOR |
|---|---|---|---|---|
| 1. | None | Mondur MR 1st | 124 | — |
| 2. | 2.0% Foamstab 200[1] | " | 135 | — |
| 3. | None | Polyol 1st[2] | 101 | 1475 |
| 4. | 2.0% Foamstab 200[1] | " | 115 | 1653 |

[1]Foamstab 200 = Polyoxyalkylene/unsaturated diester reaction product, available from Sloss Industries Corporation.
[2]Polyol 1st = Binder addition sequence of Examples 1 and 2.

We claim:
1. A synthetic board comprising lignocellulosic material bonded together with a binder comprising an organic polyisocyanate having at least two active isocyanate groups per molecule and a polyester polyol, the binder including a surfactant which adjusts the surface tension of the binder to a value about equal to or lower than the critical surface tension of the lignocellulosic material and helps to compatibilize the binder components, the amount of the surfactant being from about 0.01 to 5 percent by weight, based on the weight of the polyester polyol, with the proviso that the polyol does not contain any fatty acid material.

2. The synthetic board of claim 1 wherein the polyisocyanate is a polymethylene polyphenyl polyisocyanate.

3. The synthetic board of claim 2 wherein the polyester polyol comprises
   (a) about 65 to 100% by weight of polyester polyol,
   (b) about 0 to 35% by weight of an alkylene glycol having the formula

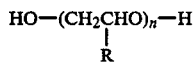

wherein R is a member selected from the group consisting of hydrogen and lower alkyl of one to four carbon atoms and n is from 1 to 10, and
   (c) about 0 to 35% by weight of at least one other polyol.

4. The synthetic board of claim 1 wherein the lignocellulosic material is bonded together to form a member selected from the group consisting of a particleboard, a waferboard, an oriented waferboard and an oriented strand board.

5. The synthetic board of claim 2 wherein the polyester polyol comprises an aromatic polyester polyol having a hydroxyl number of about 100 to 700 and an average functionality of about 1 to 8.

6. The synthetic board of claim 5 wherein the aromatic polyester polyol comprises
   (a) about 65 to 100% by weight of polyester polyol,
   (b) about 0 to 35% by weight of an alkylene glycol having the formula

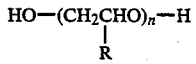

wherein R is a member selected from the group consisting of hydrogen and lower alkyl of one to four carbon atoms and n is from 1 to 10, and
   (c) about 0 to 35% by weight of at least one other polyol.

7. The synthetic board of claim 2 wherein the polyester polyol comprises an aromatic polyester polyol having a hydroxyl number of about 100 to 400 and an average functionality of about 2 to 3.

8. The synthetic board of claim 7 wherein the aromatic polyester polyol comprises
   (a) about 85 to 100% by weight of polyester polyol, and
   (b) about 0 to 15% by weight of an alkylene glycol having the formula

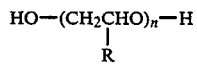

wherein R is a member selected from the group consisting of hydrogen and lower alkyl of one to four carbon atoms and n is a from 2 to 3.

9. A composition for bonding together lignocellulosic material comprising (a) a binder comprising an organic polyisocyanate having at least two active isocyanate groups per molecule and an aromatic polyester polyol having a hydroxyl number of about 100 to 700 and an average functionality of about 1 to 8, the equivalent ratio of polyisocyanate to polyol being about 10:1 to 2:1, and (b) a surfactant, the amount of the surfactant being from about 0.01 to 5 percent by weight, based on the weight of the aromatic polyester polyol, with the proviso that the aromatic polyester polyol does not contain any fatty acid material.

10. A binder for lignocellulosic material comprising
   (1) organic polyisocyanate having at least two active isocyanate groups per molecule and a polyester polyol comprising
      (a) about 65 to 100% by weight of polyester polyol,
      (b) about 0 to 35% by weight of an alkylene glycol having the formula

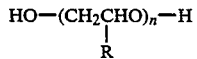

wherein R is a member selected from the group consisting of hydrogen and lower alkyl of one to four carbon atoms and n is from 1 to 10, and
      (c) about 0 to 35% by weight of at least one other polyol, the equivalent ratio of polyisocyanate to polyol being about 10:1 to 2:1, and
   (2) a surfactant which adjusts the surface tension of the binder to a value about equal to or lower than the critical surface tension of the lignocellulosic material and helps to compatibilize the binder components, the amount of the surfactant being from about 0.01 to 5 percent by weight, based on the weight of the polyester polyol, with the proviso that the polyester polyol does not contain any fatty acid material.

* * * * *